United States Patent
Wojcik

(10) Patent No.: US 6,684,020 B2
(45) Date of Patent: Jan. 27, 2004

(54) OPTICAL FIBER RETENTION DEVICE

(75) Inventor: Thaddeus Wojcik, Hopewell, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 176 days.

(21) Appl. No.: 09/874,845

(22) Filed: Jun. 5, 2001

(65) Prior Publication Data

US 2002/0181923 A1 Dec. 5, 2002

(51) Int. Cl.[7] .................................................. G02B 6/00
(52) U.S. Cl. ....................................................... 385/135
(58) Field of Search .......................... 385/135, 37, 12, 385/10, 122, 130, 134–136, 137, 138, 147

(56) References Cited

U.S. PATENT DOCUMENTS 5,469,526 A * 11/1995 Rawlings ..................... 385/135
5,724,469 A * 3/1998 Orland ........................ 385/135
6,118,914 A * 9/2000 Davis et al. .................. 385/37
6,314,229 B1 * 11/2001 Sasaki et al. ................ 385/135

FOREIGN PATENT DOCUMENTS

JP          8-229794     * 8/1996   ................. 385/135

* cited by examiner

Primary Examiner—Jean F. Duverne

(57) ABSTRACT

An optical fiber retention device that has a generally planar body having a surface coated with an adhesive. The optical fiber is affixed to the surface by adhering to the adhesive coated surface such that the surface holds the fiber in position but the fiber can be easily removed by pulling the desired length of fiber off of the coated surface. A plurality of tabs extend outwardly from the planar body and contact the printed circuitboard for positioning the planar body at a predetermined distance away from the circuitboard to enable electronic components to be located on the circuitboard beneath the planar body. The tabs also have a planar surface coated with an adhesive that contacts the circuitboard to mount the optical fiber retention device to the circuitboard.

14 Claims, 3 Drawing Sheets

OPTICAL FIBER RETENTION DEVICE

BACKGROUND OF THE INVENTION

The present invention relates to a device to retain a coiled or flexible member, and, more particularly, to a device for containing a length of optical fiber to allow the easy coiling and uncoiling of the optical fiber to the retention device and the device is adapted to be affixed to a planar surface such as a printed circuitboard.

There are currently in use various devices, such as spools and the like, that are used to contain a flexible member, including optical fibers, and such devices can be affixed to a printed circuitboard. Typically, such devices are used to retain a length of such optical fiber in a coil so that the fiber is available and to present a neat appearance by providing a coiling device to take up any excess fiber to keep it out of the way of other components associated with the printed circuitboard.

With the use of optical fiber it is preferred to have a quantity of the optical fiber on hand in such circuit boards for later use if additional fiber is needed as well as certain technical reasons, that is, an additional length of the optical fiber reduces the effect of an echo in the transmission of signals over that fiber.

One of the difficulties of the present fiber retention devices, however, is that they are normally quite cumbersome to wrap and to unwrap the optical fiber around the retaining device and, due to the close quarters in which such devices are used, it would be advantageous if there were an optical fiber retaining device that would enable the technician to easily wrap and unwrap the optical fiber with a minimum of intricate movements of the fiber, that is, a device where the technician can simply wrap and unwrap the optical fiber in a easy, straightforward manner.

As a further drawback of the present optical fiber retention devices, there is required a means of affixing the fiber retaining device to the printed circuitboard. With the use of printed circuitboards, however, the real estate on the board itself is very valuable so it is not at all desirable for the fiber retaining device to be affixed directly to the circuitboard so as to take up the real estate. Current means of affixing the fiber retention devices to a circuitboard include the use of screws that mate with screw holes provided in the circuitboard, adhesives that affix the fiber retaining device directly to the circuitboard and the use of tie wraps as well as other retaining devices. In all of the aforementioned current means of affixation, however, the method of affixation is relatively cumbersome and may require tools and the retention device takes up a considerable amount of that valuable real estate on the circuitboard itself, thus reducing the space available for the necessary electronic components on that circuitboard.

Thus, it would be advantageous to have a fiber retention device that would enable the easy coiling and uncoiling of the optical fiber within the device and which is easily affixed to a circuitboard without taking up the valuable real estate on that circuitboard

SUMMARY OF THE INVENTION

In accordance with the present invention, therefore, there is provided a optical fiber retention device that overcomes the difficulties and problems of the present prior art retention devices and which allows the coiling and uncoiling of the optical fiber with respect to the device. As used, the present invention will be described as specifically relating to the preferred environment, that of its use in the coiling and uncoiling of an optical fiber, however, as will be seen, the present invention can be used with other flexible members, including electrical wires.

The present optical fiber retaining device is made up of a relatively thin material, preferably of a plastic material but may be another material, such as metal or wood and which has one surface thereof coated with an adhesive material. That surface is preferably a flat, planar surface. The adhesive is selected such that an optical fiber can be affixed to the adhesive coated surface of the optical fiber retention device to securely retain the fiber to the adhesive surface, but which enables the removal of the optical fiber by simply exerting a small force to pull the optical fiber off of the adhesive coated surface.

Accordingly the optical fiber retention device includes a raised guide surface that extends outwardly from the surface on which the adhesive is coated, and the raised guide surface allows the optical fiber to be wrapped or coiled around that raised guide surface so as to provide a guide for the wrapping or coiling of the optical fiber and to insure that the optical fiber is properly and neatly coiled around the guide surface of the device. In the preferred embodiment, the raised guide surface is comprised of a pair of circular surfaces that are displaced with respect to each other, however, other configurations of raised guide surfaces can be used with the present device. Such other configuration can be circular, elliptical or other irregular shape.

In addition, the present optical fiber retention device is readily affixed to a surface, such as the surface of a printed circuitboard, by means of at least one, preferable a plurality, of tabs that can be extended outwardly in a direction rearwardly from the adhesive coated surface and which tab or tabs can be affixed to the surface of the printed circuitboard to retain the optical fiber retention device thereto. By making the length of the tabs to be at least a predetermined length, the planar coated surface of the optical fiber retention device is, after affixation, located a finite, predetermined distance away from the surface of the printed circuitboard, that is, the tabs act as standoffs so that the planar surface that is coated with the adhesive is displaced sufficiently away from the surface of the circuitboard so as to not take up any of the valuable real estate on that circuitboard. Thus, the tabs can be formed as integral with the planar surface of the fiber retention therefrom so as to minimize the costs of producing the optical fiber retention device and yet allow electronic components to be present on the printed circuitboard beneath the retention device.

As a further feature of the present invention, the outer ends of the tabs can be, themselves, formed as generally planer surfaces that are coated with an adhesive so that the outwardly extending ends of the tabs can simply be contacted to the surface of the printed circuitboard to secure the optical fiber retention device to the circuitboard, thus no tools or other affixation devices, such as screws, are needed to properly secure the present optical fiber retention device to a printed circuitboard. As an alternative, an adhesive can be applied to the generally planar surfaces of the tabs at the time the optical fiber retention device is affixed to a circuitboard.

As a still further feature of the present invention, the optical fiber retention device can be used, not only for the affixing of the coiled optical fiber to a printed circuitboard, but can be used for the shipping of the optical fiber in commerce, that is, the manufacturer of the optical fiber can initially coil the optical fiber onto a retention device constructed in accordance with the present invention and then ship that optical fiber in the form of the pre-coiled optical fiber already affixed to the retention device so that the customer need not uncoil the optical fiber from some form of reel of the manufacturer but can simply directly use the optical fiber as it is received to affix the fiber to a printed circuitboard.

Other features of the present optical fiber retention device will become apparent in light of the following detailed description of a preferred embodiment thereof and as illustrated in the accompanying drawings.

DETAILED DESCRIPTION OF THE INVENTION

Figure 1:
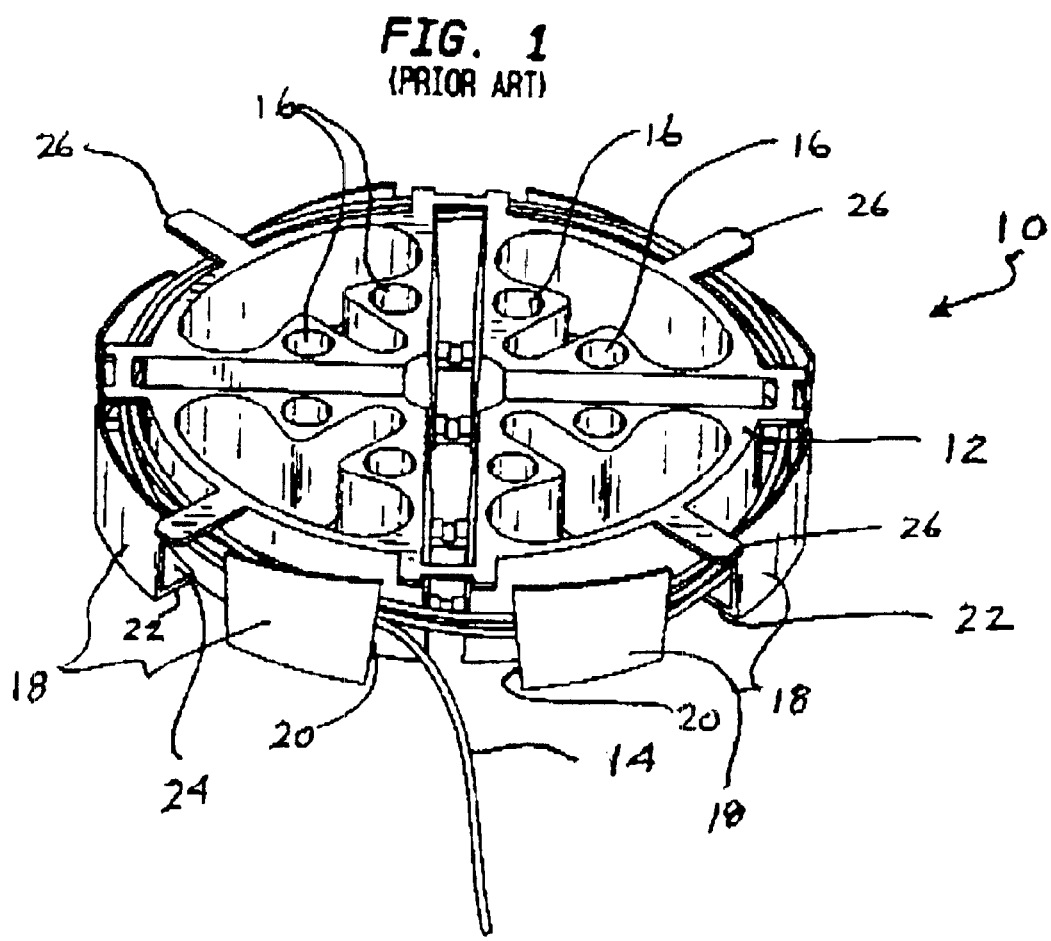
FIG. 1 is a perspective view of a prior art reel used to maintain a coil of optical fiber in connection with a printed circuitboard.

Referring now to FIG. 1, there is shown a perspective view of an optical fiber reel 10 that is typical of a optical fiber retention device currently used to maintain a coil of optical fiber. With the optical fiber reel 10, there is a generally circular core area 12 around which is coiled the optical fiber 14. The core area 12 may have various holes 16 that can be used to secure the optical fiber reel 10 to a printed circuitboard. As can also be seen, there are a plurality of outer flanges 18 that form the outer diameter of the optical fiber reel 10. The outer flanges 18 are normally molded as a part of the overall optical fiber reel 10 and include vertical portions 20 and horizontal lower portions 22 thereby forming a fiberoptic fiber trough 24 between the outer flanges 18 and the generally circular core area 12 to house the optical fibers 14. The outer flanges 18 are formed as discrete spaced apart flanges and there are radial flanges 26 that are located in the spaces between the outer flanges 18.

Accordingly, as can be seen, the optical fiber 14 is secured within the fiberoptic fiber trough 24 and the coiling an uncoiling of the optical fiber 14 with respect to the optical fiber reel 10 is accomplished by a serpentine manner with the optical fiber 14 being wound within the interior of the outer flanges 18 and underneath the radial flanges 26 whenever a space is encountered intermediate adjacent outer flanges 18. Thus, the optical fiber 14 must be rather carefully and somewhat painstakingly wound and unwound with respect to the optical fiber reel 10 and is not an easy procedure. The technician or assembler, in utilizing the typical prior art optical fiber reel 10 faces a rather time consuming and not particularly user friendly task in the coiling and uncoiling of the optical fiber 14 with respect to the optical fiber reel 10. In addition, the affixing of the optical fiber reel 10 is not an easy task and may require additional parts and the use of hand tools to carry out that affixation of the optical fiber reel 10 to a printed circuitboard.

Figure 2:
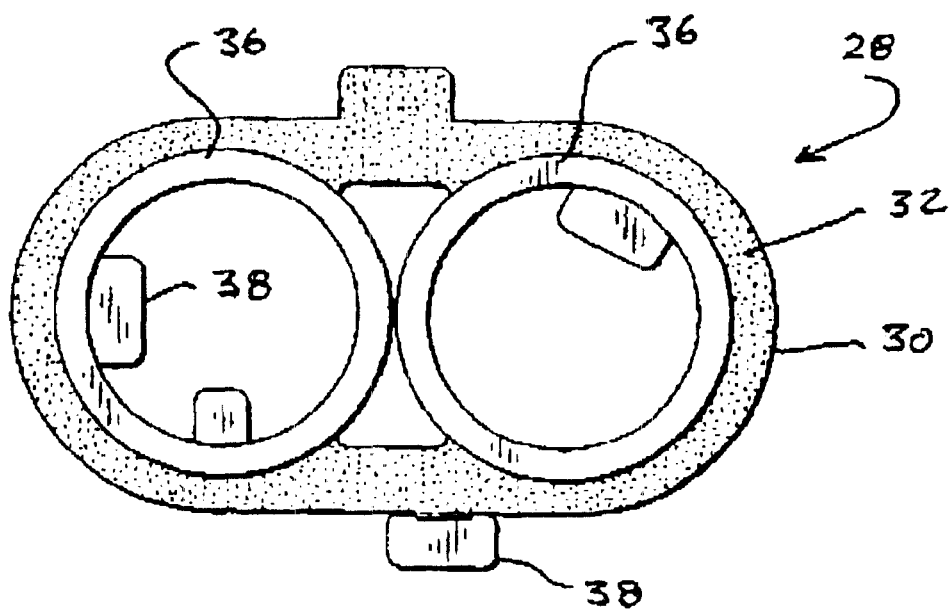
FIG. 2 is a top plan view of the optical fiber retention device constructed in accordance with the present invention.
Figure 3:
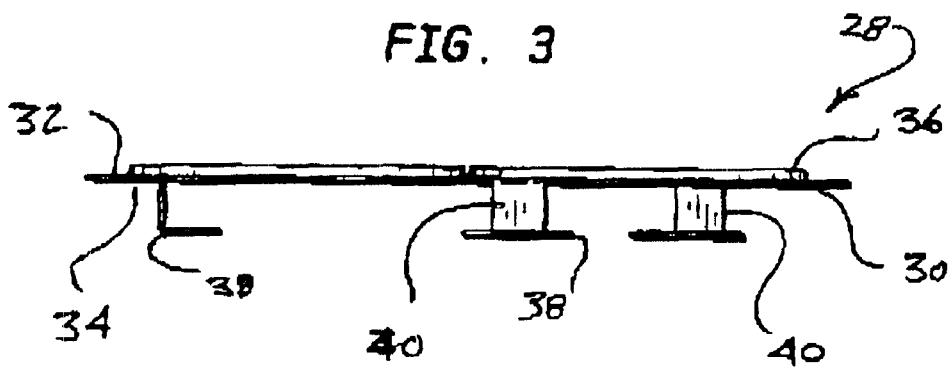
FIG. 3 is side view of the optical fiber retention device of FIG. 2.

Turning now to FIGS. 2 and 3, there is shown, respectively, a top plan view and a side view of an optical fiber retention device 28 constructed in accordance with the present invention. The device 28 comprises a flat, planar body 30 that is generally oval in configuration and which has an upper surface 32 and a lower surface 34. By convention herein, the upper surface 32 is referred to as the surface that faces away from a printed circuitboard when the optical fiber retention device 28 is affixed thereto as will be later explained. The lower surface 34 is that surface that faces the printed circuitboard. As such, therefore, there is an adhesive that is coated to the upper surface 32 as a film based surface and is the surface that faces away from a printed circuitboard. The flat, planar body 30 can be a plastic material having a thickness of between about 0.20 to about 0.40 mm and the material is preferably a plastic polycarbonate composition sold under the trademark Lexan.

As such, therefore, there is an adhesive coating on the upper surface 32 and which is adapted to cause an optical fiber to adhere to the upper surface 32. The adhesive can be any of a variety of adhesives, however a preferred adhesive is an acrylic based adhesive of which many different varieties are commercially available. It is important, however, that the characteristics of the adhesive be such that it can adhere to a optical fiber that is contacted with the adhesive and thus the optical fiber can be placed in contact with the upper surface 32 and will remain adhered to the upper surface 32. On the other hand, a further characteristic is that it must be an adhesive that will release the optical fiber upon a reasonable force attempting to pull the optical fiber off of the adhesive coated upper surface 32 and it may be that the adhesive may be applied to both the upper surface 32 and the lower surface 34 of the flat, planar body 30. The particular adhesive must meet the customer requirements with respect to various requirements and specifications desired by that customer, such as fire retardant characteristics, conductivity, adhesion to Lexan plastic and ESD passivity. If the adhesive is on both surfaces, the optic fiber retention devices 30 may be stacked in their assembly to a printed circuitboard.

Thus, as will be seen, the upper surface 32 having the adhesive coated thereto can be used to coil an optical fiber thereon and the optical fiber will adhere to the upper surface 32 to hold that optical fiber firmly in place, even during the commercial shipping of the optical fiber retention device 28, however, in the event a user wants to uncoil some or all of the optical fiber, the user can easily part the optical fiber from the adhesive coating by simply pulling the needed length of optical fiber off of that adhesive surface and the remaining length of optical fiber will still remain firmly adhered to the upper surface 32.

In FIGS. 2 and 3, there also can be seen a raised guide surface 36 that provides a guide for the optical fiber that is affixed to the upper surface 32. The raised guide surface 36 extends upwardly from the upper surface 32 and forms a guide around which the optical fiber can be coiled. In the preferred embodiment, the height of the raised guide surface 36 may be between about 0.8 mm. to about 1.0 mm. however that height may vary depending upon the diameter of the optical fiber that is used with the particular optical fiber retention device 28 as well as the anticipated maximum number of coils of the optical fiber around the raised guide surface 36.

In the embodiment as shown, the raised guide surface 36 is formed by the use of a pair of circular surfaces that are slightly displaced with respect to each other so that the optical fiber can be wound around both of the outer surfaces of the circular surfaces or basically in an oval configuration. Obviously, other shapes and configurations of raised guide surfaces 36 can be used in carrying out the intent of the present invention.

There are a plurality of tabs 38 that are formed as a part of the optical fiber retention device 28 and, as specifically shown in FIG. 3, the tabs extend outwardly from the lower surface 34, that is, the surface opposite that surface having the adhesive coated thereon, and the tabs 38 include a vertical leg 40 that extends generally at a right angle to the plane of the flat, planar body 30 as well as a horizontal leg 42 that is formed generally at a right angle to the vertical leg 40. The length of the vertical leg 40 is predetermined so as to provide sufficient distance of the flat, planar body 30 away from a printed circuitboard when the optical fiber retention device 28 is actually affixed to a printed circuitboard. The horizontal leg 42 also preferably has an adhesive coating on the bottom surface thereof such that the horizontal leg 42 can readily be affixed to a printed circuitboard by means of that adhesive coating adhering to the surface of a printed circuitboard. Again, as an alternative, an adhesive may be applied by the user in affixing the optical fiber retention t device 28 to a circuitboard.

Figure 4:
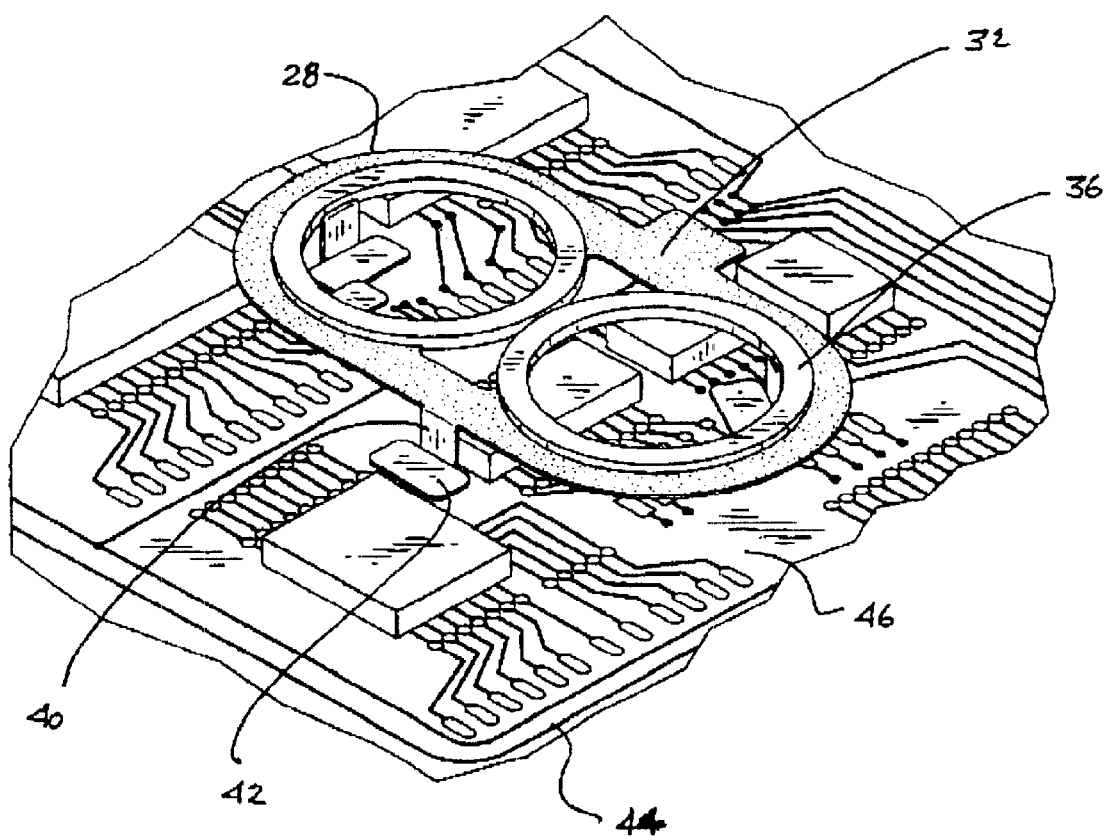
FIG. 4 is a perspective view of an optical fiber retention device of the present invention affixed to a printed circuitboard.

Turning now to FIG. 4, there is shown a perspective view of a printed circuitboard 44 on which is mounted an optical fiber retention device 28 constructed in accordance with the present invention. As such, the optical fiber retention device 28 is adhered to the upper surface 46 of the printed circuitboard 44 by means of the tabs 38 such that there is a finite distance between the plane of the printed circuitboard 44 and the plane of the flat, planar body 30.

Accordingly, the present optical fiber retention device 28 can be easily affixed to the upper surface 46 of the printed circuitboard by means of the adhesive coating provided on or applied to the bottom of the horizontal legs 42 and yet the flat, planar body 30 is located at a sufficient distance from the plane of upper surface 46 of the printed circuitboard 44 so as to allow electronic components to be located beneath the flat, planar body 30 and thus, the optical fiber retention device 28 can be readily affixed to a printed circuitboard 44 without taking up any appreciable real estate on the printed circuitboard 44.

As was previously alluded to, a further advantage of the present optical fiber retention device 28 is that it can be produced very inexpensively and can therefore serve, not only as a convenient device to be affixed to a printed circuitboard by the end user, but can be used by the manufacturer of the optical fiber itself as a frame to ship the optical fiber already coiled within the optical fiber retention device 28 and therefore is a simple task for that manufacturer to produce and shop the optical fiber that is not only inexpensive but is convenient to the user who can directly use the optical fiber retention device 28 without having to uncoil and then recoil the optical fiber onto a separate retention device.

It will be understood that the scope of the invention is not limited to the particular embodiment disclosed herein, by way of example, but only by the scope of the appended claims.

I claim:

1. A retention device for a flexible member, said retention device comprising:

a generally planar body having an upper surface and a lower surface, an adhesive substance on the upper surface for releasably retaining a flexible member comprising at least one of an optical fiber and an electrical wire, a raised guide surface extending upwardly from the upper surface, configured so that said flexible member can be wound around the upper surface, and at least one tab extendible rearwardly from said lower surface for affixing said retention device to a surface.

2. A retention device for a flexible member as defined in claim 1 wherein said guide surface comprises a pair of circular surfaces spaced apart.

3. A retention device for a flexible member as defined in claim 1 wherein said surface is a printed circuitboard.

4. A retention device for a flexible member as defined in claim 1 wherein said at least one tab comprises a plurality of tabs.

5. A retention device for a flexible member as defined in claim 4 wherein said plurality of tabs have vertical legs and horizontal legs and wherein said horizontal legs have an adhesive surface coated thereon.

6. A retention device for a flexible member as defined in claim 1 wherein said generally planar body is a plastic material comprised of a flame retardant polycarbonate film.

7. A retention device for a flexible member as defined in claim 6 wherein said plastic body has a thickness of between about 0.2 mm and 0.4 mm.

8. A retention device for a flexible member as defined in claim 6 wherein said polycarbonate body includes a raised guide surface.

9. A printed circuitboard comprising a first surface containing a plurality of electronic components affixed thereto;

an optical fiber retention device affixed to said surface of said printed circuitboard, said optical fiber retention device comprising a planar body having a lower surface and an upper surface, the upper surface coated with an adhesive material for releasably retaining a flexible member thereto, said planar body having at least one tab extending from said lower surface, said at least one tab having a generally planar leg, said generally planar leg adapted to be affixed to said first surface, wherein said planar body is located in a predetermined distance away from said first surface to enable the electronic components to be located on said first surface beneath said planar body.

10. A printed circuitboard as defined in claim 9 wherein said generally planar leg of said at least one tab has an adhesive coating precoated thereon.

11. A printed circuitboard as defined in claim 9 wherein said planar body of said optical fiber retention device comprises a plastic composition.

12. A printed circuitboard as defined in claim 11 wherein said plastic composition is a polycarbonate material.

13. A printed circuitboard as defined in claim 11 wherein said lower surface is also coated with an adhesive.

14. A printed circuitboard as defined in claim 11 wherein said flexible member is an optical fiber.

* * * * *